United States Patent
Jo et al.

(10) Patent No.: US 8,379,594 B2
(45) Date of Patent: Feb. 19, 2013

(54) DEVICE AND METHOD TO PLAY BACK CONTENTS ACCORDING TO RECEPTION SENSITIVITY

(75) Inventors: Hwan-ju Jo, Suwon-si (KR); Chee-hwan Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1026 days.

(21) Appl. No.: 11/580,940

(22) Filed: Oct. 16, 2006

(65) Prior Publication Data

US 2007/0091835 A1  Apr. 26, 2007

(30) Foreign Application Priority Data

Oct. 21, 2005  (KR) .................. 10-2005-0099877

(51) Int. Cl.
*H04Q 7/00* (2006.01)

(52) U.S. Cl. ........ 370/331; 455/560; 455/450; 455/436; 455/435.1; 455/445; 370/235; 370/230; 370/242; 370/349

(58) Field of Classification Search .............. 455/436, 455/3.01–3.06, 435.1, 450, 445, 560, 439, 455/456, 3.6, 413, 414.1; 370/328, 331; 709/219, 218; 379/88.17

See application file for complete search history.

(56) References Cited

U.S. PATENT DOCUMENTS

| | | | |
|---|---|---|---|
| 6,243,581 B1 * | 6/2001 | Jawanda .................. 455/432.2 |
| 6,741,293 B1 * | 5/2004 | Obuchi ...................... 348/554 |
| 6,954,615 B2 * | 10/2005 | Sano ......................... 455/41.1 |
| 7,286,190 B2 * | 10/2007 | Klopfenstein et al. ...... 348/569 |
| 2003/0103521 A1 * | 6/2003 | Raphaeli et al. ............ 370/445 |
| 2003/0125025 A1 * | 7/2003 | Lim .............................. 455/435 |
| 2004/0077341 A1 * | 4/2004 | Chandranmenon et al. .. 455/418 |
| 2004/0261112 A1 * | 12/2004 | Hicks et al. .................... 725/89 |
| 2005/0037757 A1 * | 2/2005 | Moon et al. ................... 455/436 |
| 2005/0037765 A1 * | 2/2005 | Rajkotia et al. .............. 455/450 |
| 2005/0070281 A1 * | 3/2005 | Rajkotia et al. ........... 455/435.1 |
| 2005/0213687 A1 * | 9/2005 | Matsui et al. ................ 375/316 |
| 2006/0056336 A1 * | 3/2006 | Dacosta ....................... 370/328 |
| 2006/0072757 A1 * | 4/2006 | Renkis ......................... 380/270 |
| 2006/0094432 A1 * | 5/2006 | Chang et al. ................. 455/439 |

(Continued)

FOREIGN PATENT DOCUMENTS

| | | |
|---|---|---|
| CN | 1492678 A | 4/2004 |
| JP | 11-331721 | 11/1999 |

(Continued)

OTHER PUBLICATIONS

U.S. Appl. No. 11/546,401, filed Oct. 12, 2006, Ui-Taek Oh et al., Samsung Electronics Co., Ltd.

(Continued)

*Primary Examiner* — Joseph Arevalo
(74) *Attorney, Agent, or Firm* — Jefferson IP Law, LLP

(57) ABSTRACT

A device and method to play back contents according to a reception sensitivity, more specifically, a device and method to select a wireless communication system according to the reception sensitivity of wireless signals such as AirTV signals, digital multimedia broadcasting signals and wireless LAN signals, and playing back received multimedia content. The device includes a communication unit receiving multimedia content through a wireless communication device corresponding to a selection instruction message input by a user among one or more wireless communication devices; a reception sensitivity check unit checking the reception sensitivity of the received multimedia content; and an interface unit outputting the received multimedia content according to the reception sensitivity.

15 Claims, 7 Drawing Sheets

U.S. PATENT DOCUMENTS

2006/0248412 A1* 11/2006 Cho .............................. 714/704
2007/0117506 A1* 5/2007 Park et al. .................... 455/3.01

FOREIGN PATENT DOCUMENTS

| KR | 1997-19485 | 4/1997 |
| KR | 10-376005 | 3/2003 |
| KR | 2003-37373 | 5/2003 |
| KR | 2003-65232 | 8/2003 |
| KR | 2004-44665 | 5/2004 |
| KR | 2004-100171 | 12/2004 |
| KR | 2005-92620 | 9/2005 |
| KR | 10-591843 | 6/2006 |

OTHER PUBLICATIONS

Notice of Examination issued by the Korean Intellectual Property Office in Korean Patent Application No. 2005-99877 on Feb. 7, 2007.
Abstract of KR 2005-67867.

* cited by examiner

FIG. 4
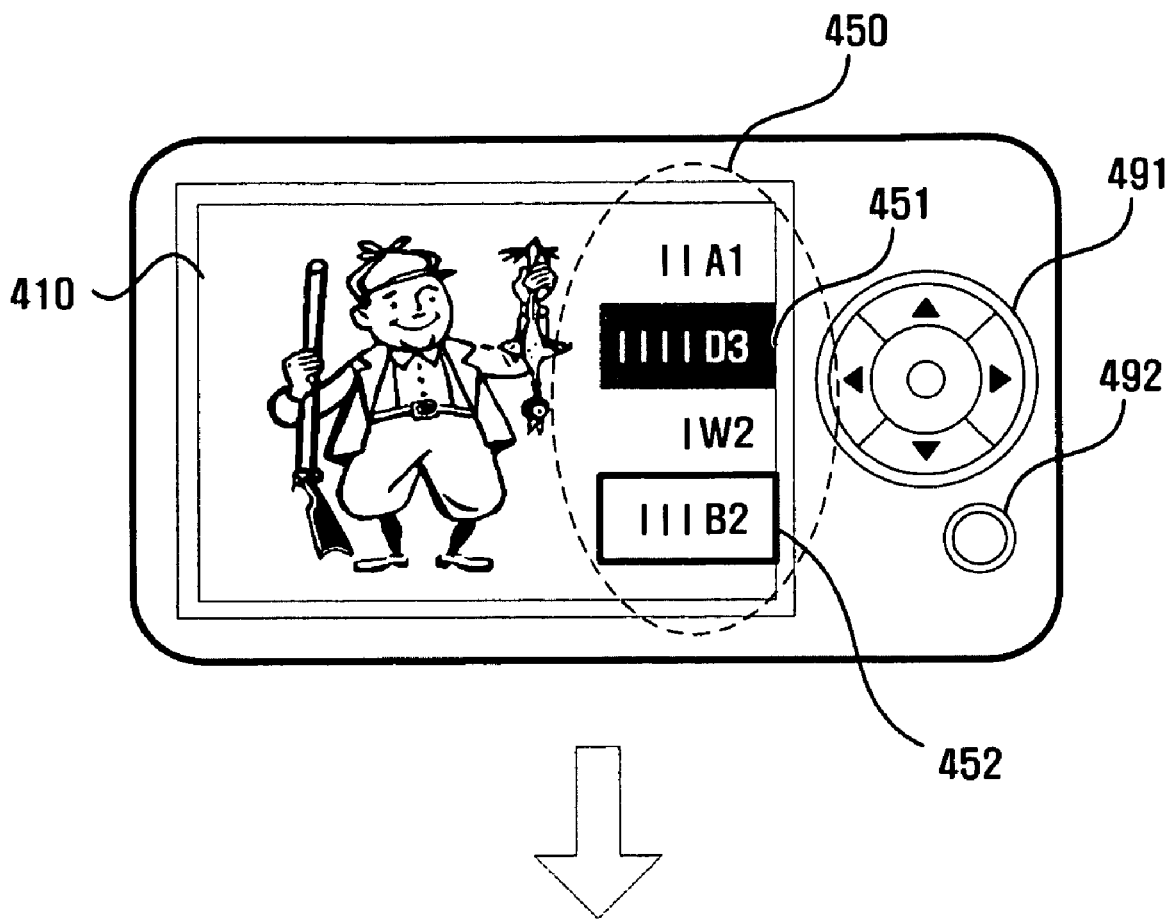
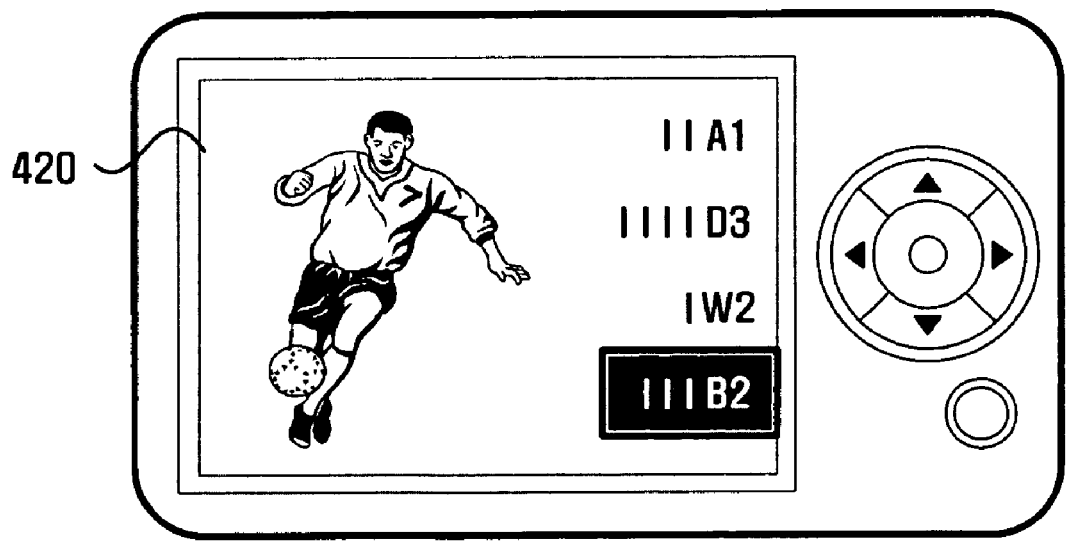

DEVICE AND METHOD TO PLAY BACK CONTENTS ACCORDING TO RECEPTION SENSITIVITY

CROSS-REFERENCE TO RELATED APPLICATION

This application claims the benefit of Korean Application No. 2005-99877, filed on Oct. 21, 2005, in the Korean Intellectual Property Office, the disclosure of which is incorporated herein by reference.

BACKGROUND OF THE INVENTION

1. Field of the Invention

Aspects of the present invention relate to a device and method to play back contents according to a reception sensitivity, and more particularly, to a device and method to select a wireless communication system according to the reception sensitivity of wireless signals, such as AirTV signals, digital multimedia broadcasting signals, or wireless LAN signals, and to play back received multimedia content.

2. Description of the Related Art

With the evolution of communication and network techniques in recent years, wired network environments using a wire medium, such as a coaxial cable or an optical cable, have become increasingly replaced by wireless network environments using radio waves in various frequency bands.

FIG. 1 shows multimedia content provided by conventional wireless communication techniques. In order to share communication paths, a wireless LAN 14 uses, for example, the IEEE 802.11 communication standard, the IEEE 802.11a communication standard, the IEEE 802.11b communication standard, or the IEEE 802.11g communication standard. These standards are wireless network standards using CSMA/CA (carrier sense multiple access/collision avoidance) (i.e., an Ethernet protocol) to transmit data at a transfer rate of 11 Mbps to 54 Mbps.

In addition to wireless LANs based on the IEEE 802.11 communication standard, wireless networks based on the IEEE 802.16e communication standard have been developed. This standard is called a wireless broadband 15. The wireless broadband 15 is an Internet service that uses a frequency bandwidth of 2.3 GHz and has a mobility of 60 km/h or more and a transfer rate of approximately 1 Mbps. The wireless broadband 15 has a maximum radio propagation distance of about 48 km, which is ten or more times larger than the service radius of the wireless LAN 14 that can be used in a service area called a hot-spot.

A user that wants to use a wireless network may access a local area network through a mobile network 11. In the wireless network using the mobile network 11, a base station relays between a wireless section and a wired section, which has an advantage in that a user in the mobile network 11 can use the wireless network.

A wireless technique to provide multimedia content can be applied to a satellite communication technique, which makes it possible for a user to view multimedia content transmitted from a satellite through a portable terminal 10. An AirTV system 12 and a digital multimedia broadcasting (hereinafter, referred to as DMB) system 13 may be used to display the multimedia content transmitted from the satellite.

The DMB systems 13 are classified into a terrestrial DMB system and a satellite DMB system according to a transfer means (a ground wave or a satellite, respectively). The terrestrial DMB systems are divided into an in-band type using an AM/FM band and an out-of-band type using a new frequency band. The in-band type has a bit rate of approximately 384 kbps, and the out-of-band type has a bit rate of approximately 526 kbps. The satellite DMB system provides a service in a frequency band of 2.535 to 2.655 GHz, which is an ultrahigh frequency considerably higher than the frequency band of the terrestrial DMB system. The terrestrial DMB system provides a service by using a transmitting station radiating radio waves, while the satellite DMB system provides a service by using a satellite outside of the earth's atmosphere. Therefore, the satellite DMB system can provide a service covering a wider range.

Although the AirTV system 12 has not yet been commercially used, the AirTV system 12 is expected to eventually provide approximately 60 TV channels with various languages, and Internet, e-mail, and data services at a transfer rate of approximately 40 Mbps.

As described above, wireless communication services can be provided through various wireless communication techniques. However, there are many wireless communication restrictions, such as a bandwidth restriction and an interference of radio waves, in providing services by using the various wireless communication techniques. That is, the portable terminal 10 may not smoothly receive multimedia content due to the surrounding environment and the communication environments. Therefore, in order to smoothly receive multimedia content, the user of the portable terminal 10 must move to a region where multimedia content is received at high reception sensitivity, or the user must receive the multimedia content only during a time period when the multimedia content is received at high reception sensitivity. The user of the portable terminal 10 provided with various wireless communication techniques should connect with a wireless communication system having a higher reception signal to receive multimedia content with a high reception sensitivity.

Korea Patent Unexamined Publication No. 2003-37373 discloses a method of realizing a roaming service that enables roaming between a wireless LAN and a mobile network and which detects the levels of reception signals received through a wireless LAN and a mobile network, compares the levels of the reception signals, and performs data communication through one of the wireless LAN and the mobile network having a higher signal level. However, in the above-mentioned method, comparison the levels of the received reception signals depends on the communication systems. This results in frequent switching between communication systems due to a variation in the surrounding environments, such as whenever the user moves from one place to another place. Therefore, there needs to be a method of stably receiving wireless communication signals without increasing the number of switching operations between communication systems.

SUMMARY OF THE INVENTION

Aspects of the present invention provide a technique to select a wireless communication system according to the reception sensitivity of wireless signals, such as AirTV signals, digital multimedia broadcasting signals, and wireless LAN signals and for playing back received multimedia content and to prevent an increase in the number of switching operations between wireless communication systems.

According to an aspect of the invention, there is provided a device to play back contents according to a reception sensitivity, the device including a communication unit receiving multimedia content through a wireless communication device selected from among one or more wireless communication devices on the basis of a selection instruction message input by a user; a reception sensitivity check unit checking the reception sensitivity of the received multimedia content; and an interface unit outputting the received multimedia content according to the reception sensitivity.

According to another aspect of the invention, there is provided a method of playing back contents according a reception sensitivity, the method including receiving multimedia content through a wireless communication device selected from among one or more wireless communication devices on the basis of a selection instruction message input by a user; checking the reception sensitivity of the received multimedia content; and outputting the received multimedia content according to the reception sensitivity.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is a diagram illustrating the display of reception sensitivities according to an embodiment of the present invention;

DETAILED DESCRIPTION OF THE EMBODIMENTS

Figure 1:
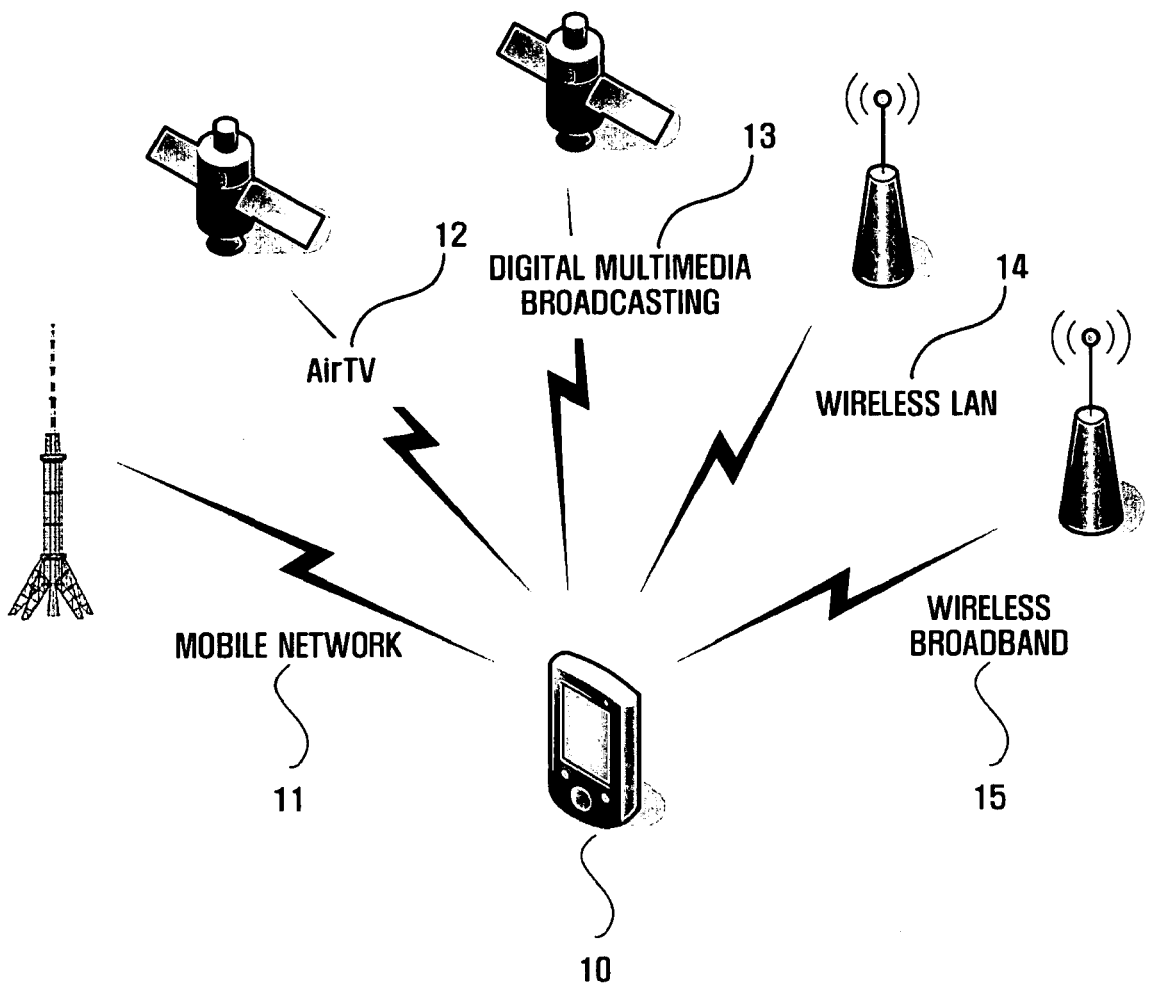
FIG. 1 is a block diagram illustrating a conventional wireless communication technique to provide multimedia content.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

It is understood that blocks in the accompanying block diagrams and compositions of operations in flow charts can be performed by computer program instructions. These computer program instructions can be provided to processors of, for example, general-purpose computers, special-purpose computers, and programmable data processing apparatuses, although not limited thereto. Therefore, the instructions performed by, for example, the computer or the programmable data processing apparatus execute functions described in the blocks in the block diagrams or the operations in the flow charts. The computer program instructions can be stored in a computer usable memory or a computer readable memory of the computer or the programmable data processing apparatus in order to realize the functions in a specific manner. However, it is understood that the instructions may be stored in any computer-readable storage medium. Therefore, the instructions stored in, for example, the computer-usable memory or the computer-readable memory can perform the functions described in the blocks in the block diagrams or the operations in the flow charts. Also, the computer program instructions can, for example, be loaded onto the computer or the programmable data processing apparatus. Therefore, a series of operational steps are performed in the computer or the programmable data processing apparatus to generate a process executed by the computer, which makes is possible for the instructions performed on the computer or the programmable data processing apparatus to provide operations to execute the functions described in the blocks of the block diagrams or the operations of the flow charts.

Each block or each operation may indicate a portion of a code, a module, or a segment including one or more executable instructions to perform a specific logical function (or functions). It should be noted that, in some modifications of the invention, the functions described in the blocks or the operations may be executed in a different order. For example, two blocks or operations that are shown as being sequential can actually be performed at the same time, or they can be performed in reverse order depending on the functions of the blocks.

Figure 2:
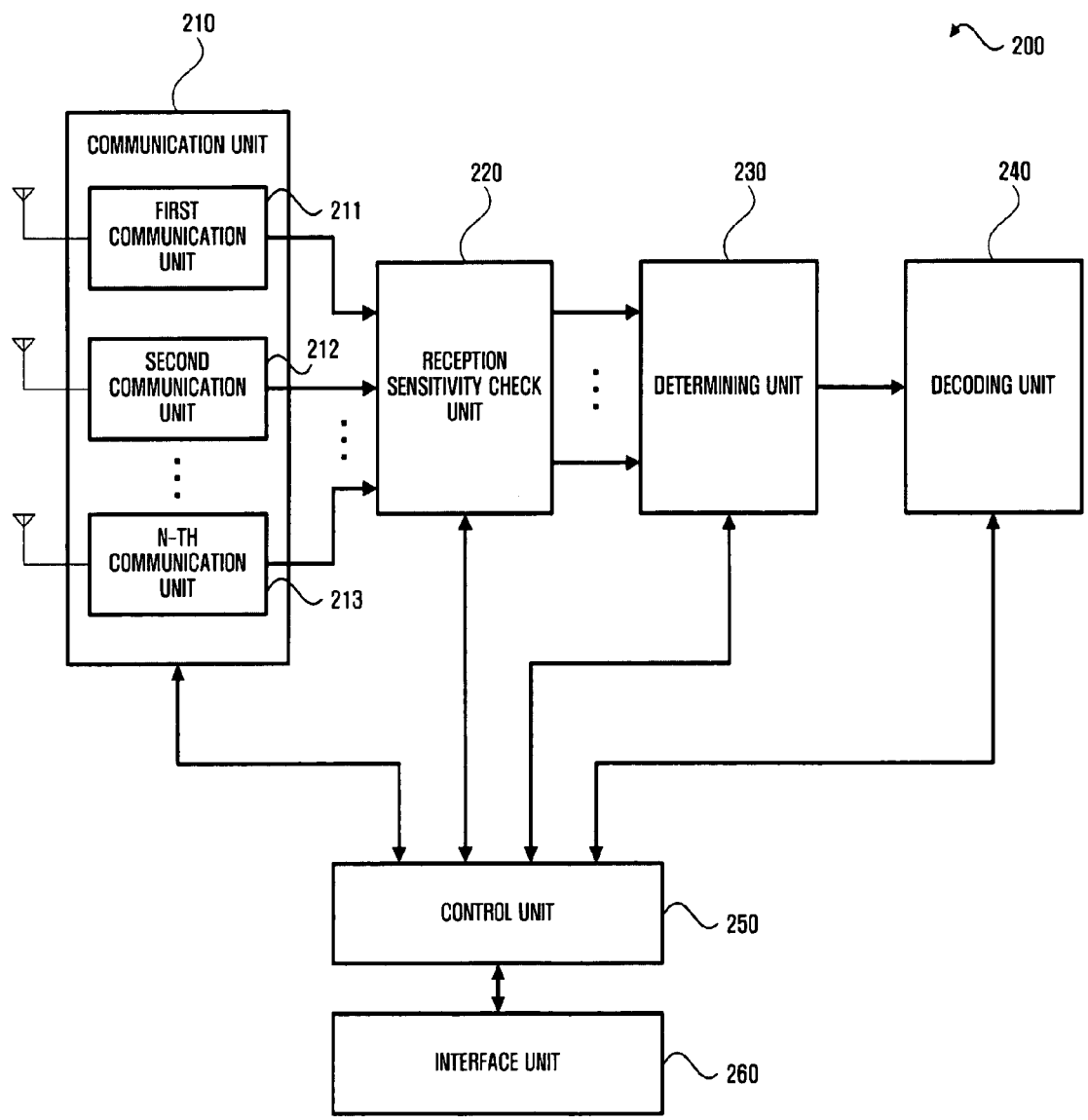
FIG. 2 is a block diagram illustrating a device to play back multimedia contents according to a reception sensitivity according to an embodiment of the present invention.

FIG. 2 is a block diagram illustrating a device to play back multimedia contents according to reception sensitivity according to an embodiment of the invention. A device 200 to play back multimedia contents according to reception sensitivity (hereinafter, referred to as a content playing device) includes a communication unit 210, a reception sensitivity check unit 220, a determining unit 230, a decoding unit 240, a control unit 250, and an interface unit 260, although not limited thereto.

The communication unit 210 includes a plurality of wireless communication units and receives multimedia contents by using one of the plurality of wireless communication units corresponding to a selection instruction message input by a user. The selection instruction message includes information items, such as, although not necessarily and not limited to, a wireless-communication-system type field, a channel field, a reception sensitivity check field, a threshold reception sensitivity field, a priority field, a message field, and a reservation field. A detailed description of the selection instruction message is provided below with reference to FIG. 3.

Each of the wireless communication units included in the communication unit 210 can receive multimedia contents by using at least one of, although not limited to, an AirTV system, a digital multimedia broadcasting system, a wireless LAN system, and a wireless broadband system. However, it is understood that wireless communication units can use any wireless communication system to receive multimedia content, and are not limited to those systems listed above, in the prior art, or otherwise later developed.

The communication unit 210 shown in FIG. 2 includes N communication units therein (hereinafter, referred to as sub-communication units); that is, a first communication unit 211, a second communication unit 212, and through an N-th communication unit 213. Each of the sub-communication units can receive multimedia contents by using one or more of the wireless communication systems as described above. While not required in all aspects, the communication unit 210 may include different types of wireless communication units, or may include wireless communication units of the same type in aspects of the invention.

For example, the first communication unit 211 may use the AirTV wireless communication system 12, the second communication unit 212 may use the digital multimedia wireless broadcasting system 13, and the N-th communication unit 213 may use the wireless LAN communication system 14. Alternatively, the first and second communication units 211 and 212 may use the AirTV wireless communication system 12, and the N-th communication unit 213 may use the digital multimedia wireless communication system 13:

One or more of the sub-communication units 211, 212, 213 may, although not necessarily, each include a tuner and a demodulator. A multimedia content signal received by the tuner is demodulated by a demodulator corresponding to the tuner. The demodulator demodulates the original multimedia content signals from modulated wave signals. The demodulator in one or more of the sub-communication units may, although not necessarily and not limited to, include an automatic gain control amplifier, an oscillator, an analog-to-digital (A/D) converter, a symbol recovery unit, and a channel decoder. However, it is understood that the demodulators can be otherwise constructed.

The automatic gain control amplifier functions to compensate for a signal gain in order to convert received multimedia content signals to digital signals. That is, when a weak multimedia content signal is received, the automatic gain control amplifier amplifies the output of the received multimedia content signal such that an analog-to-digital conversion can be performed. The oscillator generates a sampling frequency to sample the received multimedia content signal. The A/D converter converts the multimedia content signal amplified by the automatic gain control amplifier into a digital signal on the basis of the sampling frequency generated by the oscillator.

The converted digital multimedia content signal is transmitted to the symbol recovery unit. The symbol recovery unit receives timing errors of the current symbols obtained by processing baseband signals in a feedback manner, and reduces an error between the digital signals received from the A/D converter. Then, the symbol recovery unit removes phase noise and interference between symbols from the digital signal, and transmits the digital signal to the channel decoder. The channel decoder extracts synchronizing signals inserted at the time of transmission from the baseband signal, and decodes received data (that is, the multimedia content signal) by using the extracted synchronizing signal.

The demodulator may, although not necessarily, be an OFDM (orthogonal frequency division multiplex) demodulator. In this case, the demodulator divides one channel into a plurality of narrow-band sub-channels, allocates a plurality of sub-carrier waves orthogonal to each other to the narrow-band channels, modulates the sub-carrier waves, and multiplexes the sub-carrier waves.

The reception sensitivity check unit 220 checks the reception sensitivity of the received multimedia content signal. The reception sensitivity checked by the reception sensitivity check unit 220 may be the intensity of a radio wave, or an error rate included in the multimedia content signal, but is not limited thereto.

The determining unit 230 determines whether to output multimedia contents on the basis of the reception sensitivity checked by the reception sensitivity check unit 220. That is, the determining unit 230 determines to output the received multimedia contents when the checked reception sensitivity exceeds a predetermined threshold value for the content received at the wireless sub-communication unit 211, 212, or 213. When the reception sensitivity of the received multimedia content is lower than a predetermined threshold value of the wireless sub-communication unit 211, 212, or 213, the determining unit 230 determines to output other multimedia content having a higher reception sensitivity than the threshold value set to correspond to a different wireless sub-communication unit 211, 212, or 213.

For example, in the AirTV system 12, when the reception sensitivity of the multimedia content received by the first communication unit 211 is lower than a threshold value set to the first communication unit 211, the determining unit 230 may determine to output the multimedia content by the digital multimedia broadcasting system 13 or the wireless LAN system 14, on the basis of the reception sensitivity of the multimedia content received by the second communication unit 212 according to the digital multimedia broadcasting system or by the N-th communication unit 213 according to the wireless LAN system. Alternatively, the determining unit 230 may determine to output multimedia content having a higher reception sensitivity than a threshold value set to correspond to the wireless communication device according to priority on the basis of the selection instruction message. Also, the priority can be pre-selected by default or by reception intensity. An example of the determination of output according to a priority will be described in detail below with reference to FIG. 5.

The decoding unit 240 decodes audio or video signals of the multimedia content output in response to the determination of the determining unit 230. A plurality of multimedia contents may be received from the determining unit 230. Therefore, the decoding unit 240 may include a plurality of decoders, and one of the plurality of decoders may decode the audio and video signals of the plurality of multimedia contents in the order in which the plurality of multimedia contents is transmitted. That is, the content playing device 200 may, although not necessarily, simultaneously play a plurality of multimedia contents in a picture-in-picture manner or by screen division. It is understood that the decoder 240 need not be used in all aspects, such as where the multimedia content is data or is to be stored in an encoded fashion.

The shown interface unit 260 includes an input unit and an output unit. The input unit receives a selection instruction message for multimedia contents from a user. The user may, although not necessarily, input the selection instruction message through the input unit, such as a button, a touch pad, or a touch screen, although not limited thereto. The output unit of the interface unit 260 outputs audio and/or video signals. When the multimedia content determined by the determining unit 230 is included in the multimedia contents selected by the selection instruction message input by the user, the output unit may, although not necessarily, output a message indicating that the multimedia content is included therein. While shown as combined, it is understood that the input unit can be separate from the output unit, and that one or more of the units can be interfaces and/or plugs connectable to external displays and/or speakers.

When the reception sensitivity of a first multimedia content that the user wants is lower than a threshold value, the user can view a second multimedia content through a different wireless sub-communication unit 211, 212, 213, with the first multimedia content set to a predetermined state. In this example, when the reception sensitivity of the first multimedia content becomes higher, the user can know the reception sensitivity of the first multimedia content through a message output from the output unit. Alternatively or in addition to the message, the apparatus can automatically switch back to the first multimedia content.

The output unit includes an audio output unit, such as a speaker, and/or a video output unit to display input image signals, such as, although not limited to, a cathode ray tube (CRT), a liquid crystal display (LCD), a light-emitting diode (LED), an organic light-emitting diode (OLED), or a plasma display panel (PDP).

The interface unit 260 can display the reception sensitivity of the multimedia content received by the wireless sub-communication unit corresponding to the selection instruction message in real time. An example of the display of reception sensitivity will be described in detail below with reference to FIG. 4.

The control unit 250 controls the communication unit 210, the reception sensitivity check unit 220, the determining unit 230, the decoding unit 240, the interface unit 260, and the content playing device 200 on the basis of the selection instruction message.

Figure 3:
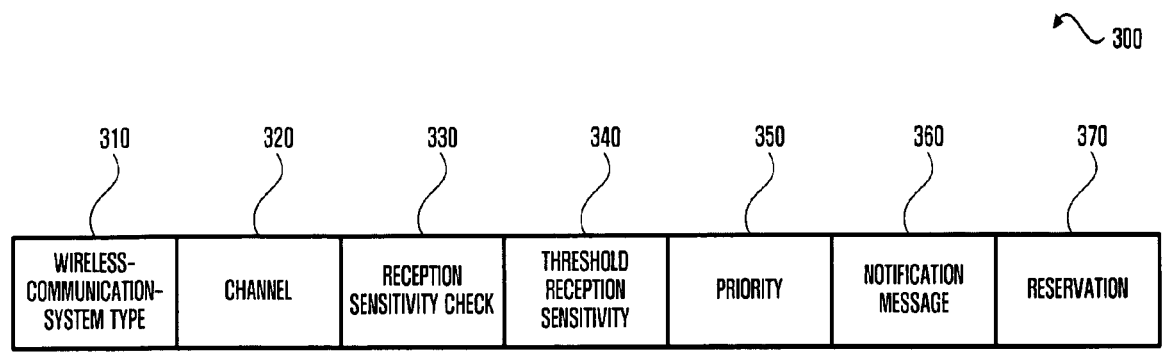
FIG. 3 is a diagram illustrating a selection instruction message according to an embodiment of the present invention.

FIG. 3 is a diagram illustrating a selection instruction message 300 according to an embodiment of the present invention. As shown in FIG. 3, a selection instruction message 300 includes information items, such as, although not necessarily and not limited to, a wireless-communication-system type field 310, a channel field 320, a reception sensitivity check field 330, a threshold reception sensitivity field 340, a priority field 350, a notification message field 360, and a reservation field 370. However, it is understood that ones of the fields need not be used, such as where the message 300 is part of a standard or where the message is predetermined. Also, additional fields can be included in the message 300.

The type of wireless communication system is input to the wireless-communication-system type field 310. That is, a type of wireless communication system (such as the AirTV system, the digital multimedia broadcasting system, the wireless LAN system, or the wireless broadcasting system) may be input to the wireless-communication-system type field 310.

One of a plurality of channels to be provided by the wireless communication system indicated in the wireless-communication-system type field 310 may be input to the channel field 320. A flag is input to the reception sensitivity check field 330 indicating whether the reception sensitivity of the multimedia content received through the channel of the wireless communication system input to the channel field 320 is checked. That is, when a value of 0 is input to the reception sensitivity check field 330, the reception sensitivity check unit 220 does not check the reception sensitivity of the corresponding multimedia content. When a value of 1 is input to the reception sensitivity check field 330, the reception sensitivity check unit 220 checks the reception sensitivity of the corresponding multimedia content.

When the value of 0 is input to the reception sensitivity check field 330, values input to the next fields (that is, the threshold reception sensitivity field 340, the priority field 350, the notification message field 360, and the reservation field 370) may be neglected.

A threshold value, that is, a threshold reception sensitivity, is input to the threshold reception sensitivity field 340. The threshold reception sensitivity is compared with the reception sensitivity of the multimedia content which is selected and received to determine whether to process the multimedia content (for example, to play or output a message). The priority of the selection instruction message 300 is input to the priority field 350. That is, the priority of the output of the multimedia content, which is received through a specific channel by the wireless communication system indicated in the wireless-communication-system type field 310 and the channel field 320, is input to the priority field 350.

For example, three selection instruction messages 300, a first priority selection instruction message, a second priority selection instruction message, and a third priority selection instruction message, are input in the messages, the reception sensitivities of the multimedia contents requested by the first and third priority selection instruction messages are lower than a threshold reception sensitivity, whereas the reception sensitivity of the multimedia content selected by the second selection instruction message is higher than the threshold reception sensitivity. In this case, the content playing device 200 plays back the multimedia content requested by the second priority selection instruction message. According to an aspect of the present invention, even if the priority of the multimedia content requested by the third priority selection instruction message is higher than the threshold reception sensitivity, the content playing device 200 does not play back the multimedia content in response to the third priority selection instruction message as the reception sensitivity is below the threshold.

On the other hand, according to an aspect of the present invention, when the reception sensitivity of the multimedia content requested by the first priority selection instruction message is higher than the threshold reception sensitivity, the content playing device 200 stops playing back the multimedia content requested by the second priority selection instruction message, and plays back the multimedia content requested by the first priority selection instruction message.

In an aspect of the invention, switching between wireless communication systems can be performed in response to only pre-selected information (priority 350). Therefore, the content playing device 200 checks only the reception sensitivity of multimedia content having a higher priority than the multimedia content being currently played.

A flag indicating whether to output a message is input to the notification message field 360. When the reception sensitivity of the multimedia content that is selected and received is higher than the threshold reception sensitivity input to the threshold reception sensitivity field 340, a message is output to notify a user of this fact. A value of 0 or 1 can be input to the notification message field 360. When a value of 0 is input to the notification message field 360, the content playing device 200 outputs no message. When a value of 1 is input to the notification message field 360, the content playing device 200 outputs a message. However, it is understood that the field 360 can include a message text, or the text can be otherwise generated.

A reception sensitivity check time for multimedia contents whose reception sensitivity will be checked and a flag indicating whether to check the reception sensitivity of the multimedia contents are input to the reservation field 370. For example, a user can input a start time and an end time to the reservation field 370. When a reservation time is input to the reservation field 370, the content playing device 200 checks the reception sensitivity for only the reservation time. When the reservation time has elapsed, the content playing device 200 stops checking the reception sensitivity. As a result, the content playing device 200 does not perform unnecessary operations and the messages can expire.

FIG. 4 shows a diagram illustrating a display of the reception sensitivity according to an embodiment of the invention. One or more selection instruction messages 300 may be input to the content playing device 200. That is, the user may input one selection instruction message 300 in order to view the multimedia content provided through a specific channel by a specific wireless communication system, or the user may input more than one selection instruction messages 300 in order to view multimedia contents provided through channels of different wireless communication systems. Further, the user may input more than one selection instruction messages 300 in order to view different multimedia contents provided through different channels of the same wireless communication system.

According to an aspect of the present invention, the user may input values to the reception sensitivity check field 330, the threshold reception sensitivity field 340, the priority field 350, the notification message field 360, and the reservation field 370 included in the selection instruction message 300 to automatically play back multimedia contents that the user wants. According to another aspect, after checking the level of the reception sensitivity of the corresponding multimedia content, the user may manually play back the multimedia content.

In order for the user to play back multimedia contents, the content display device 200 displays reception sensitivities 450 of the multimedia contents corresponding to the selection instruction messages 300 input by the user.

FIG. 4 shows an example of the reception sensitivities 450 of the multimedia contents corresponding to four selection instruction messages 300 input by the user are displayed on a predetermined region of a screen. The level of the reception sensitivities may be displayed using a number of bars, as shown in FIG. 4, or it may be displayed using a predetermined icon color. However, it is understood that the level of the reception sensitivities can be displayed in any variety of ways that can indicate between different levels.

When the level of the reception sensitivity is displayed using a number of bars as shown in FIG. 4, the more the number of bars, the higher the level of the reception sensitivity. When the level of the reception sensitivity is displayed using the color of an icon, the levels of the reception sensitivities may, although not necessarily, be represented by red and blue or gradations therebetween. That is, when an icon is blue, the level of the reception sensitivity is high. When an icon is red, the level of the reception sensitivity is low. However, it is understood that other or more colors can be used, or that a single color can be used.

According to an aspect of the present invention, characters and figures displayed on the screen may indicate the type of wireless communication system and channels. That is, 'A1' indicates channel No. 1 of the AirTV system 12, and 'D3' indicates channel No. 3 of the digital multimedia broadcasting system 13. In addition, 'W2' indicates channel No. 2 of the wireless LAN system 14, and 'B2' indicates channel No. 2 of the wireless broadcasting system 15. The type of wireless communication system and channels may be set by the user. A reception sensitivity 451 corresponding to the multimedia content 410 being currently played may be prominently displayed such that the user can easily recognize the reception sensitivity 451. Alternatively, the sensitivities 450, 451 can be output on another display (not shown) so as to not take up space on the screen 410, 420.

The user can push directional buttons 491 provided in the content playing device 200 to move a cursor 452, and use a selection button 492 to display multimedia content 420 corresponding to a specific reception sensitivity icon selected by the cursor 452. That is, after checking the reception sensitivities 450 of the multimedia contents 420 corresponding to the selection instruction messages 300 input by the user, the user can use the directional buttons 491 and the selection button 492 of the content playing device 200 to play back a specific multimedia content. However, it is understood that touch screen displays and/or a stylus can be used such that one or more of the buttons 491, 492 need not be used, and that the buttons can be included on a keyboard of a telephone.

Figure 5:
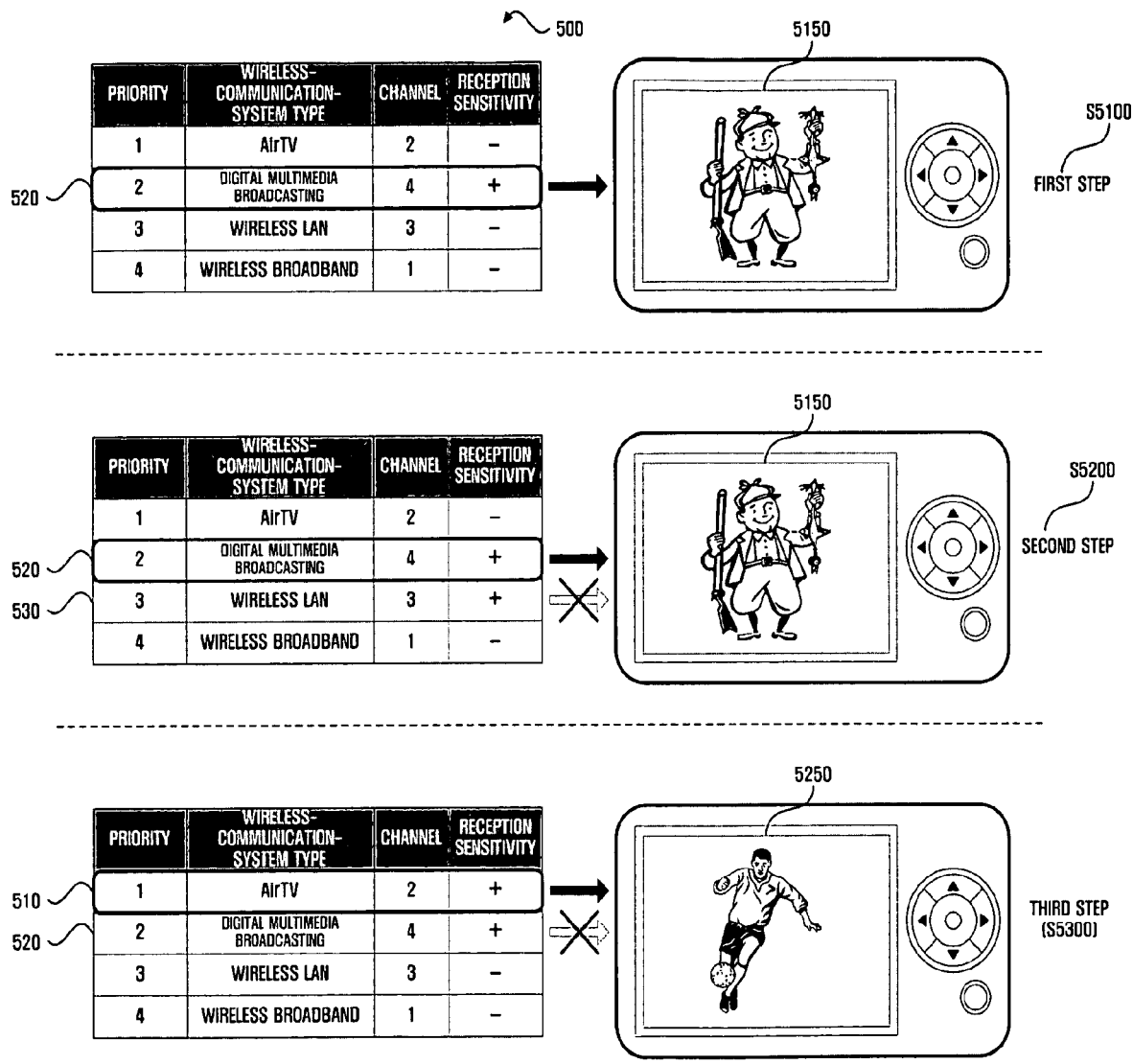
FIG. 5 is a diagram illustrating multimedia content displayed according to priority according to an embodiment of the present invention.

FIG. 5 shows that multimedia contents are displayed in a specific order according to an embodiment of the invention.

As described above, when the user inputs a plurality of selection instruction messages 300 and priorities therefor, the content playing device 200 plays back multimedia contents in a sequence depending on the priorities of the selection instruction messages 300.

FIG. 5 shows examples of priority tables 500 including priority, the type of wireless communication systems, channel, and reception sensitivities, and also shows that multimedia contents are displayed according to their priorities. The priority table 500 may be made by using the selection instruction message 300 input by the user, or it may be stored in a storage unit (not shown) of the content playing device 200.

According to an aspect of the invention, a symbol '+' or '−' is input to a reception sensitivity field of the priority table 500. The symbol '+' indicates that the reception sensitivity of the received multimedia content is higher than the corresponding threshold reception sensitivity, and the symbol '−' indicates that the reception sensitivity of the received multimedia content is lower than the corresponding threshold reception sensitivity. However, it is understood that any symbol or figure may be used to indicate whether the received reception sensitivity is higher than the threshold reception sensitivity.

In the first step S5100, the reception sensitivities of multimedia contents other than multimedia content having a second priority 520 are lower than the threshold reception sensitivity. Therefore, the content playing device 200 plays back the multimedia content 5150 provided through a channel No. 4 by the digital multimedia broadcasting system corresponding to the second priority 520.

In the second step S5200, the reception sensitivity of multimedia content having a third priority 530 is higher than the threshold reception sensitivity while the multimedia content 5150 having the second priority 520 is being played. In this case, since the priority of the multimedia content 5150 being currently played is higher than the priority of the multimedia content having a higher reception sensitivity than the threshold reception sensitivity, the content playing device 200 does not play back the multimedia content having the third priority 530 and continues to play back the multimedia content 5150 having the second priority 520.

In the third step S5300, the reception sensitivity of multimedia content 5250 having a first priority 510 is higher than the threshold reception sensitivity while the multimedia content having the second priority 520 is being played. In this case, since the priority of the multimedia content 5150 being currently played is lower than the priority of the multimedia content 5250 having a higher reception sensitivity than the threshold reception sensitivity, the content playing device 200 stops playing back the multimedia content 5150 having the second priority 520 and plays back the multimedia content 5250 having the first priority 510 provided through a channel No. 2 by the AirTV system 12.

Playing the multimedia content according to priority may be automatically performed, or it may be manually performed by the user. If the multimedia content is played automatically, as in the third step S5300 shown in FIG. 5, the content playing device 200 may automatically stop playing back the multimedia content 5150 having the second priority 520 and automatically play pack the multimedia content 5250 having the first priority 510. If the multimedia content is played manually, the content playing device 200 may indicate to a user that the reception sensitivity of the multimedia content 5250 having the first priority 510 is higher than the threshold reception sensitivity, while playing back the multimedia content 5150 having the second priority 520. The notification may be output in the form of an image or a sound, which will be described in detail below with reference to FIG. 6.

Figure 6:
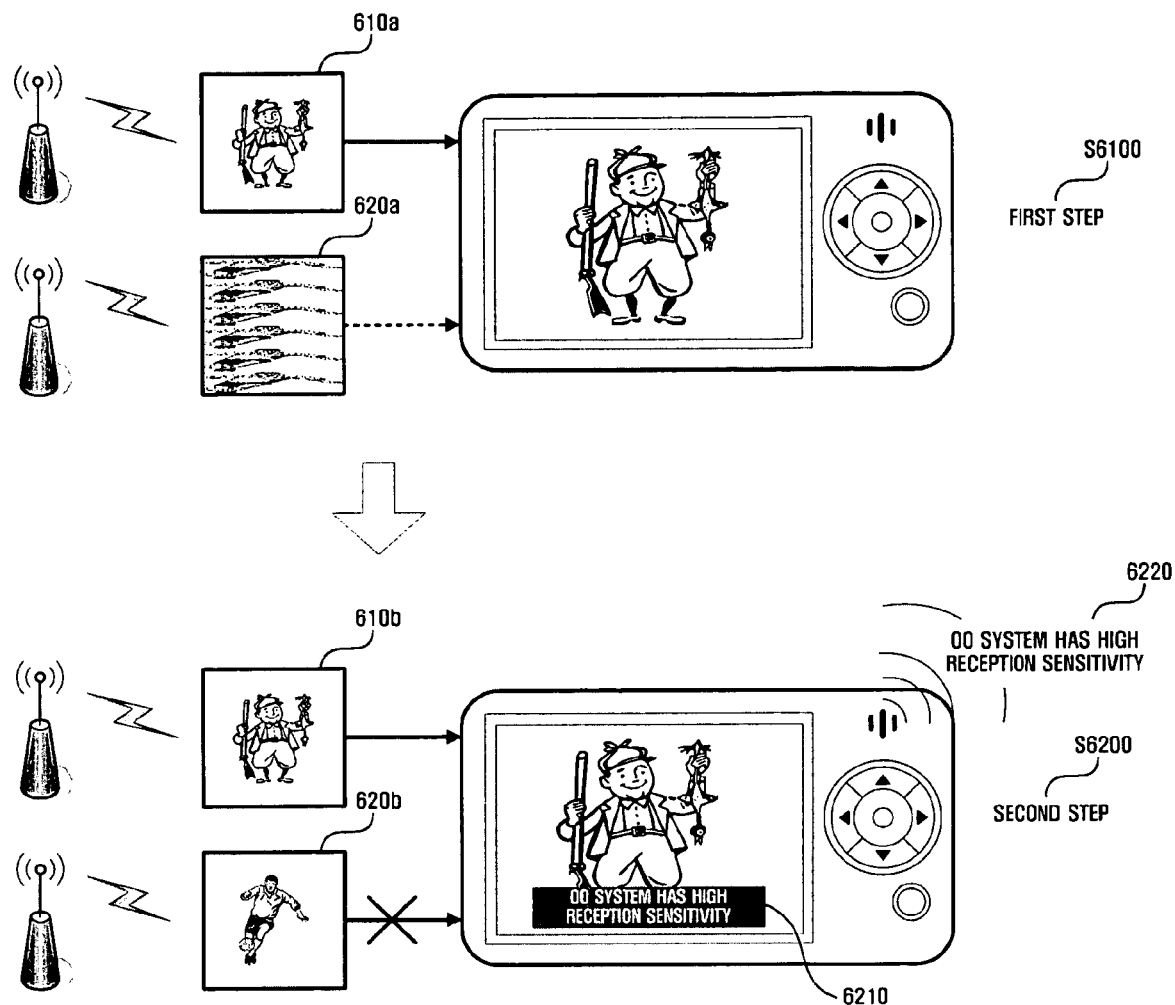
FIG. 6 is a diagram illustrating an output of a message according to an embodiment of the present invention.

FIG. 6 is a diagram showing a process of outputting a message according to an embodiment of the invention. The content playing device 200 can receive one or more multimedia contents according to the selection instruction message 300 input by the user. FIG. 6 shows the content playing device 200 receiving two multimedia contents: a first content 610*a* and a second content 620*a*. In FIG. 6, the operation of the content playing device 200 is divided into two steps: a first step S6100 and a second step S6200.

In the first step S6100, the content playing device 200 receives the first content 610*a* and the second content 620*a* according to the selection instruction message 300 input by the user. It is assumed that the second content 620 has a higher priority. In this case, since the reception sensitivity of the second content 620*a* is lower than the threshold reception sensitivity, the content playing device 200 displays only the first content 610*a* and checks the reception sensitivity of the second content 620*a* in real time. When the reception sensitivity of the second content 620*a* becomes higher than a predetermined threshold reception sensitivity, the second step S6200 is performed. In the second step S6200, the content playing device 200 outputs a message 6210 or 6220 by using an output unit provided therein, while displaying a first content 610*b*. That is, the content playing device 200 outputs a message indicating that the reception sensitivity of a second content 620*b* is good in the form of a sound 6220 or an image 6210. Then, the user can determine whether to switch the screen to the multimedia content 620*b* that is selected as the best, while viewing the multimedia content 610*b* that is selected as the second best.

Figure 7:
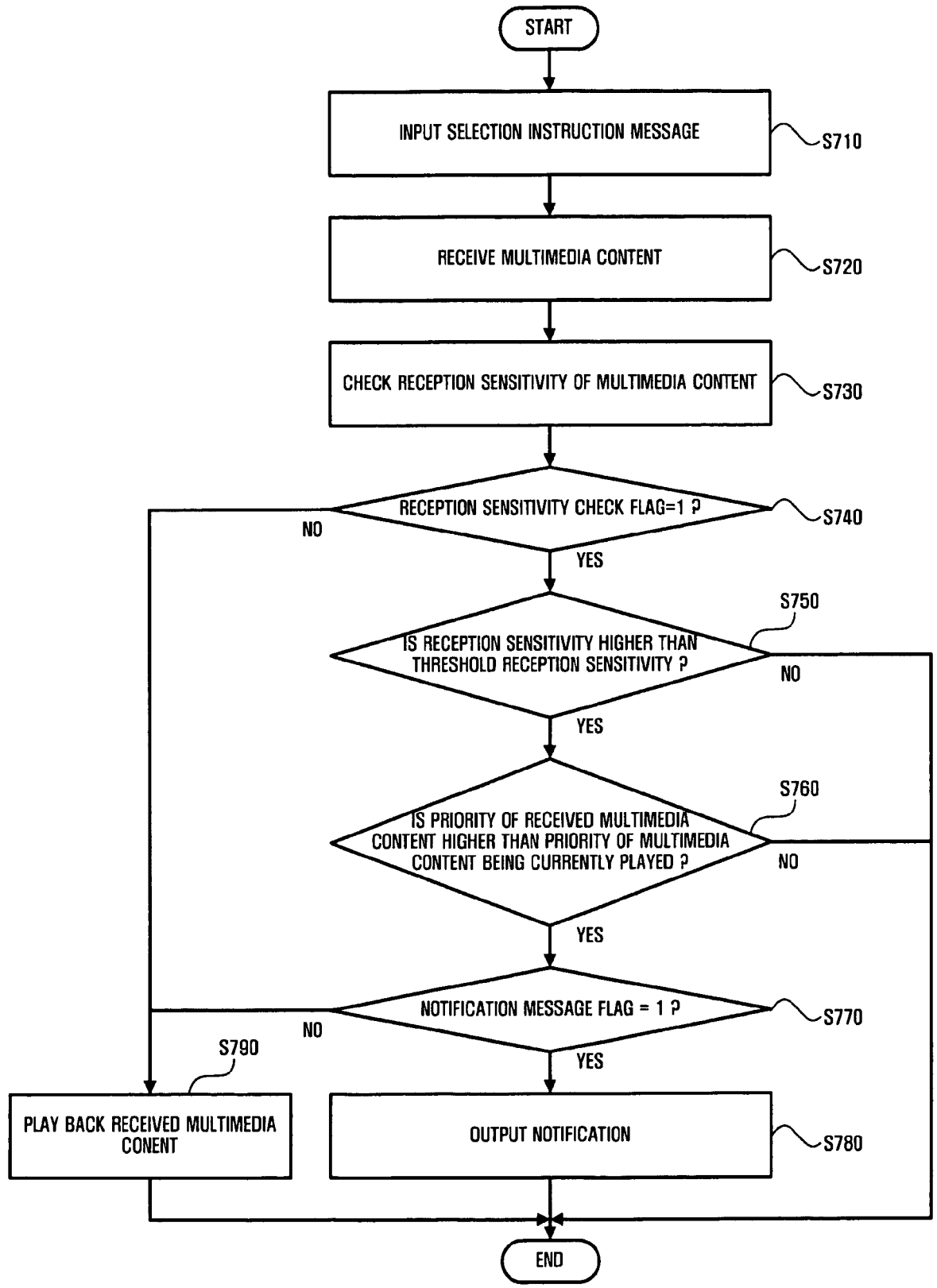
FIG. 7 is a flow chart illustrating a process of playing back contents on the basis of a reception sensitivity according to an embodiment of the present invention.

FIG. 7 is a flow chart illustrating a process of playing back multimedia contents according the reception sensitivity, according to an embodiment of the invention. In order to play back received multimedia contents according to the reception sensitivities, the content playing device 200 receives one or more selection instruction messages 300 from the user (S710). The one or more selection instruction messages 300 may include information items, such as the wireless-communication-system type field 310, the channel field 320, the reception sensitivity check field 330, the threshold reception sensitivity field 340, the priority field 350, the notification message field 360, and the reservation field 370. Since the selection instruction message 300 has been described above with reference to FIG. 3, a detailed description thereof will be omitted herein. Alternatively or in addition to receiving input from the user, the selection instruction message can be a default setting or can be received from an external device, such as from a computer networked to the device 200.

The selection instruction message 300 is transmitted to the control unit 250 through the interface unit 260. The control unit 250 controls the communication unit 210, the reception sensitivity check unit 220, the determining unit 230, the decoding unit 240, the interface unit 260, and the content playing device 200 on the basis of the one or more received selection instruction messages 300. The control unit 250 transmits the type of wireless communication system and channels included in the selection instruction message 300 to the communication unit 210. Then, the communication unit 210 receives multimedia contents from a wireless sub-communication unit corresponding to the selection instruction message 300 input by the user among one or more wireless sub-communication units provided in the communication unit 210 (S720).

Each of the wireless sub-communication devices unit in the communication unit 210 can receive multimedia contents by using at least one of, although not limited to, the AirTV system 12, the digital multimedia broadcasting system 13, the wireless LAN system, the wireless broadband system 15, or combinations thereof. However, it is understood that wireless communication units can use any wireless communication system to receive multimedia content, and are not limited to those systems listed above, otherwise existing or to be developed.

Sub-communication units 211, 212, 213 of the communication unit 210 may, although not necessarily, include different tuners and demodulators. The tuner receives multimedia content, and the demodulator demodulates the received multimedia content. The demodulated multimedia content is transmitted to the reception sensitivity check unit 220, and then the reception sensitivity check unit 220 checks the reception sensitivity of the received multimedia content (S730) received through corresponding sub-communication units 211, 212, 213.

The checked reception sensitivity is transmitted to the determining unit 230, and the determining unit 230 determines whether to output the corresponding multimedia content on the basis of the reception sensitivity. In this case, the determination of the determining unit 230 may be performed on the basis of the one or more selection instruction messages 300. That is, the determining unit 230 checks the reception sensitivity check field 330 of the selection instruction message 300 (S740). When the reception sensitivity check flag is set to zero, the determining unit 230 allows the received multimedia content to be played back regardless of the reception sensitivity transmitted from the reception sensitivity check unit 220. Then, audio or video multimedia content is transmitted to the decoding unit 240, and the decoding unit 240 decodes the audio and/or video multimedia content. The decoded multimedia content is output through the interface unit 260 (S790).

When the reception sensitivity check flag is set to 1, the determining unit 230 checks whether the reception sensitivity is higher than a predetermined threshold reception sensitivity (S750). That is, the determining unit 230 compares the threshold reception sensitivity included in the selection instruction message 300 with the reception sensitivity transmitted from the reception sensitivity check unit 220. As a result of the comparison, when the reception sensitivity transmitted from the reception sensitivity check unit 220 is higher than the threshold reception sensitivity included in the selection instruction message 300, the determining unit 230 checks the priority field 350 included in the selection instruction message 300 (S760).

When the priority of the received multimedia content is lower than the priority of the multimedia content being currently played, the determining unit 230 does not play back the received multimedia content, and continues to play back the current multimedia content. When the priority of the received multimedia content is higher than the priority of the multimedia content being currently played, the determining unit 230 checks the notification message field 360 included in the selection instruction message 300 (S770).

When a message flag is set to zero, the determining unit 230 determines to output the received multimedia content to allow the received multimedia content to be played back instead of the currently output content. Then, audio or video multimedia content is transmitted to the decoding unit 240, and the decoding unit 240 decodes the audio and/or video multimedia content. The decoded multimedia content is output through the interface unit 260 (S790).

On the other hand, when the message flag is set to 1, the determining unit 230 does not output the received multimedia content, and waits for the instruction of the control unit 250. The interface unit 260 outputs a message according to the instruction of the control unit 250 (S780). That is, the interface unit 260 outputs an audio or video message.

When the user inputs an instruction through the interface unit 260 to play back the multimedia content, the play instruction is transmitted to the determining unit 230 through the control unit 250. Then, the determining unit 230 stops playing back the current multimedia content, and allows the received multimedia content to be played back. Subsequently, the received multimedia content is transmitted to the decoding unit 240, and the decoding unit 240 performs audio and/or video decoding on the received multimedia content. The decoded multimedia content is output through the interface unit 260 (S790).

While not restricted thereto, it is understood that the device 200 to play back multimedia contents can be implemented using portable devices, such as telephones, personal digital assistants, and portable media players; non-portable devices such as displays, personal computers, audio and/or video recording and/or reproducing apparatuses, and digital video recorders; or combinations thereof.

As described above, according to a method and device to play back multimedia contents on the basis of the reception sensitivity of the multimedia content, it is possible for a user to view contents having a high reception sensitivity by selecting a wireless communication system according to the sensitivity of wireless signals and by playing back received contents. Furthermore, it is possible to prevent an increase in the number of switching operations between wireless communication systems and thus for contents to be stably displayed to a user.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A device to play back multimedia content from one or more wireless communication systems according to a reception sensitivity, the device comprising:
   a communication unit comprising wireless sub-communication units, each wireless sub-communication unit receiving a corresponding one of a plurality of multimedia content from one of the one or more wireless communication systems selected on the basis of one or more selection instruction messages input by a user;
   a reception sensitivity check unit to check the reception sensitivity of signals corresponding to each of the received plurality of multimedia content received at the corresponding wireless sub-communication units; and
   an interface unit to output a selected one of the received plurality of multimedia content according to reception sensitivities and priorities corresponding to each of the plurality of multimedia content indicated in the one or more selection instruction messages, to output a notification message to the user when switching between wireless communication systems can be performed according to the reception sensitivities and the priorities corresponding to each of the plurality of multimedia content indicated in the one or more selection instruction messages, and to receive input from the user for the performing of the switching,
   wherein if a reception sensitivity of first multimedia content that is received from a first wireless sub-communication unit of the plurality of wireless sub-communication units is lower than a first threshold value set to correspond to the first wireless sub-communication unit, the interface unit outputs a second multimedia content that is received from a second wireless sub-communication unit of the plurality of wireless sub-communication units with a reception sensitivity higher than a second threshold value set to correspond to the second wireless sub-communication unit.

2. The device as claimed in claim 1, wherein the wireless sub-communication units receive the multimedia content by using at least one of an AirTV system, a digital multimedia broadcasting system, a wireless LAN system, a wireless broadcasting system, or combinations thereof.

3. The device as claimed in claim 1, further comprising:
   a determining unit to determine whether to output the received multimedia content on the basis of the checked reception sensitivity and the one or more selection instruction messages.

4. The device as claimed in claim 3, wherein each of the wireless sub-communication units has a priority number assigned thereto in the corresponding one of the one or more selection instruction messages, and the determining unit determines to output the multimedia content that is received from a first wireless sub-communication unit, of the wireless sub-communication units, with the reception sensitivity higher than a threshold value set to correspond to the first wireless sub-communication unit, when the first wireless sub-communication unit has a first priority number that is higher than the priority number of any other of the wireless sub-communication units having the reception sensitivity higher than a corresponding threshold value.

5. The device as claimed in claim 4, wherein when the reception sensitivity of the multimedia content received from a second one of the wireless sub-communication units changes from a first level lower than the corresponding threshold value to a second level higher than or equal to the corresponding threshold value, and the second wireless sub-communication unit has a second priority number that is higher than the first priority number, the determining unit determines to output the multimedia content received from the second wireless sub-communication unit.

6. The device as claimed in claim 4, wherein when the reception sensitivity of the multimedia content received from a second one of the wireless sub-communication units changes from a first level lower than the corresponding threshold value to a second level higher than or equal to the corresponding threshold value, and the second wireless sub-communication unit has the priority number that is higher than the priority number of the first wireless sub-communication unit, the interface unit outputs a notification message to the user.

7. The device as claimed in claim 6, wherein the notification message is in a form of a sound and/or an image.

8. The device as claimed in claim 6, wherein the determining unit determines to output the multimedia content received from the second wireless sub-communication unit.

9. A device to play back contents from one or more wireless communication systems according to a reception sensitivity, the device comprising:
   a communication unit comprising one or more wireless sub-communication units, that receive corresponding multimedia content through using at least one of the one or more wireless communication systems selected on the basis of one or more selection instruction messages input by a user;
   a reception sensitivity check unit to check the reception sensitivity of the received multimedia content received at the sub-communication units;

an interface unit to output the received multimedia content according to the reception sensitivity and a priority indicated in the one or more selection instruction messages; and a determining unit to determine whether to output the received multimedia content on the basis of the checked reception sensitivity and the one or more selection instruction messages, wherein if the reception sensitivity of a first multimedia content that is received from a first wireless sub-communication unit of the one or more wireless sub-communication units is lower than a first threshold value set to correspond to the first wireless sub-communication unit, the determining unit determines to output a second multimedia content that is received from a second wireless sub-communication unit of the one or more wireless sub-communication units with the reception sensitivity higher than a second threshold value set to correspond to the second wireless sub-communication unit, and wherein the interface unit outputs a notification message to the user when switching between wireless communication systems can be performed according to the reception sensitivities and the priorities corresponding to each of the plurality of multimedia content indicated in the one or more selection instruction messages, and receives input from the user for the performing of the switching.

10. A method of playing back multimedia content from one or more wireless communication systems according to a reception sensitivity, the method comprising:

receiving multimedia content through a wireless sub-communication unit selected from among a plurality of wireless sub-communication units on the basis of one or more selection instruction messages input by a user, each of the plurality of wireless sub-communication units receiving one of a plurality of multimedia content;

checking the reception sensitivity of signals corresponding to each of the received plurality of multimedia content;

outputting a selected one of the received plurality of multimedia content according to reception sensitivities and priorities corresponding to each of the plurality of multimedia content indicated in the one or more selection instruction messages;

outputting a notification message to the user when switching between wireless communication systems can be performed according to the reception sensitivities and the priorities corresponding to each of the plurality of multimedia content indicated in the one or more selection instruction messages; and receiving input from the user for the performing of the switching, wherein if a reception sensitivity of a first multimedia content that is received from a first wireless sub-communication unit of the plurality of wireless sub-communication units is lower than a first threshold value set to correspond to the first wireless sub-communication unit, the outputting of the selected one of the plurality of multimedia content includes outputting a second multimedia content that is received from a second wireless sub-communication unit of the plurality of wireless sub-communication units with a reception sensitivity higher than a second threshold value set to correspond to the second wireless sub-communication.

11. The method as claimed in claim 10, wherein the outputting of the received multimedia content comprises determining to output the multimedia content received from a second one of the wireless sub-communication units when the reception sensitivity of the multimedia content received from the second wireless sub-communication unit changes from a first level lower than the corresponding threshold value to a second level higher than or equal to the corresponding threshold value, and the second wireless sub-communication unit has a second priority number that is higher than the first priority number.

12. The method as claimed in claim 10, further comprising outputting a notification message to the user if the reception sensitivity of the multimedia content received from a second one of the wireless sub-communication units changes from a first level lower than the corresponding threshold value to a second level higher than or equal to the corresponding threshold value, and the second wireless sub-communication unit has a second priority number that is higher than the first priority number.

13. The method as claimed in claim 12, further comprising determining to output the multimedia content received from the second wireless sub-communication unit.

14. The method as claimed in claim 12, wherein the determining of the output of the multimedia content further comprises receiving an instruction message from the user instructing whether to output the multimedia content received from the second wireless sub-communication unit.

15. A computer-readable medium encoded with instructions to execute the method of claim 10 implemented by a computer.

* * * * *